(12) United States Patent
Boucquey

(10) Patent No.: US 6,585,276 B2
(45) Date of Patent: Jul. 1, 2003

(54) FRONT-WHEEL SUSPENSION FOR A MOTOR VEHICLE

(75) Inventor: Alain Marie Victor Henri Boucquey, Woluwe-Saint-Pierre (BE)

(73) Assignee: Van Hool, naamloze vennootschap (BE)

(*) Notice: Subject to any disclaimer, the term of this patent is extended or adjusted under 35 U.S.C. 154(b) by 99 days.

(21) Appl. No.: 09/838,303

(22) Filed: Apr. 20, 2001

(65) Prior Publication Data

US 2002/0020982 A1 Feb. 21, 2002

(30) Foreign Application Priority Data

Apr. 20, 2000 (BE) .......................................... 2000/0288

(51) Int. Cl.[7] .............................................. B60G 3/18
(52) U.S. Cl. .................... 280/124.135; 280/124.138; 280/124.145; 280/124.158
(58) Field of Search ................... 280/124.135, 124.145, 280/124.144, 124.138, 124.158

(56) References Cited

U.S. PATENT DOCUMENTS

| | | | | |
|---|---|---|---|---|
| 3,850,443 A | * | 11/1974 | Hassan ....................... 116/208 |
| 4,440,420 A | * | 4/1984 | Muller ................. 280/124.135 |
| 4,783,095 A | * | 11/1988 | Rampini et al. ...... 280/124.127 |
| 4,991,867 A | * | 2/1991 | Washizu et al. ...... 280/124.135 |
| 5,048,860 A | * | 9/1991 | Kanai et al. .......... 280/124.138 |
| 5,338,055 A | * | 8/1994 | Mauz ......................... 267/280 |
| 5,364,113 A | * | 11/1994 | Goertzen .................... 180/906 |
| 5,498,020 A | * | 3/1996 | Lee ...................... 280/124.142 |
| 5,542,492 A | * | 8/1996 | Kasper ........................ 180/253 |
| 5,722,673 A | * | 3/1998 | Mauz .................. 280/124.132 |
| 6,027,130 A | * | 2/2000 | Kawabe et al. ....... 280/124.135 |
| 6,112,626 A | * | 9/2000 | Risner et al. ................ 401/195 |
| 6,113,120 A | * | 9/2000 | Heap ................... 280/124.125 |
| 6,296,264 B1 | * | 10/2001 | Wimmer ............. 280/124.134 |
| 6,412,797 B1 | * | 7/2002 | Park ........................... 267/249 |

FOREIGN PATENT DOCUMENTS

| | | | |
|---|---|---|---|
| DE | 19710138 A | * | 10/1997 |
| FR | 2 748 699 | | 11/1997 |
| FR | 2748699 A | * | 11/1997 |
| GB | 1 285 048 | | 8/1972 |

* cited by examiner

Primary Examiner—Paul N. Dickson
Assistant Examiner—Deanna Draper
(74) Attorney, Agent, or Firm—Bacon & Thomas, PLLC

(57) ABSTRACT

An improved front-wheel suspension for buses and such, whereby the suspension for each wheel (5) substantially consists of at least one upper suspension arm (1) and at least one lower suspension arm (2); in between said suspension arms (12), a pivotable connection piece (3), whereby said connection piece (3) also is connected to the wheel axle (4) of the corresponding front wheel (5); a hydraulic shock absorber (7) and an air bellows (6) which is provided above the front wheel (5), wherein said connection piece (3) consists of a connection rod (17) showing, at its upper extremity, a part (18) connected to the upper suspension arm (1) and showing, at its lower extremity, a part (19) connected to the lower suspension arm (2), whereby the part (18) is hingeably attached to the upper suspension arms (1) by means of a bearing (20) which also carries the air bellows (6).

11 Claims, 2 Drawing Sheets

FRONT-WHEEL SUSPENSION FOR A MOTOR VEHICLE

BACKGROUND OF THE INVENTION

1. Field of the Invention

The present invention relates to an improved front-wheel suspension for motor vehicles, in particular, buses.

2. Discussion of the Related Art

The invention relates to an improved front-wheel suspension which is of the type whereby the suspension of each front wheel includes at least one upper and at least one lower suspension arm; in between said suspension arms, a connection piece, whereby said connection piece is also fixed to the wheel axle of the corresponding front wheel, thereby showing an almost vertical axis of rotation; an air bellows; and a hydraulic shock absorber.

In front-wheel suspensions of the type mentioned in the aforegoing, it is common practice to provide the air bellows between the wheels of the bus and to mount the hydraulic shock absorbers underneath of and adjacent to the air bellows.

This known arrangement of the air bellows and the hydraulic shock absorbers, however, shows the disadvantage that the free space in between is narrow, in consideration of the fact that, apart from the thickness of the wheel, the width of the air bellows and the space taken up by the hydraulic shock absorbers, also in between each front wheel and the air bellows mounted adjacent thereto, sufficient space must be present for enabling a turning of said front wheel.

In the first place, this is an important disadvantage with low-floored buses, where the floor is situated immediately above the steering transmission, in other words, between the hydraulic shock absorbers, and where the width of the aisle consequently is limited to said free space in between said shock absorbers.

SUMMARY OF THE INVENTION

The present invention thus also aims at preventing the aforementioned and other disadvantages by providing an improved front-wheel suspension for motor vehicles, in particular buses, which suspension allows for more space in between the air bellows and, consequently, also in between the hydraulic shock absorbers, as a result of which the floor can be realized in such a manner that the aisle or such in the bus becomes considerably wider than this is the case with the classic suspension.

To this aim, the invention relates to an improved front-wheel suspension, whereby the suspension for each wheel substantially consists of at least one upper and at least one lower suspension arm; in between said suspension arms, a connection piece which can be pivoted along an almost vertical axis, whereby said connection piece also is connected to the wheel axle of the corresponding front wheel; an air bellows; and an hydraulic shock absorber, whereby said air bellows is provided above the front wheel.

Preferably, said connection piece between the air bellows and the wheel axle consists of a bent rod extending around the tire of the respective wheel, whereby one extremity of the rod is rotatably connected to the air bellows and an upper suspension arm, whereas the other extremity extends beyond said wheel axle and is connected to a lower suspension arm.

This configuration provides for the additional advantage that the static forces in the suspension arms are reduced drastically, whereas at the same time the dynamic forces created in the suspension arms during braking and in curves are strongly reduced.

As a consequence of the reduced tensions in the suspension arms, it then is possible to use less heavy-weight materials, as a result of which the empty weight of the vehicle is influenced in a positive manner.

BRIEF DESCRIPTION OF THE DRAWINGS

With the intention of better showing the characteristics of the invention, hereafter, as an example without any limitative character, a preferred form of embodiment of an improved front-wheel suspension for motor vehicles, in particular buses, and such is described, with reference to the accompanying drawings, wherein.

DESCRIPTION OF THE PREFERRED EMBODIMENT

Figure 1:
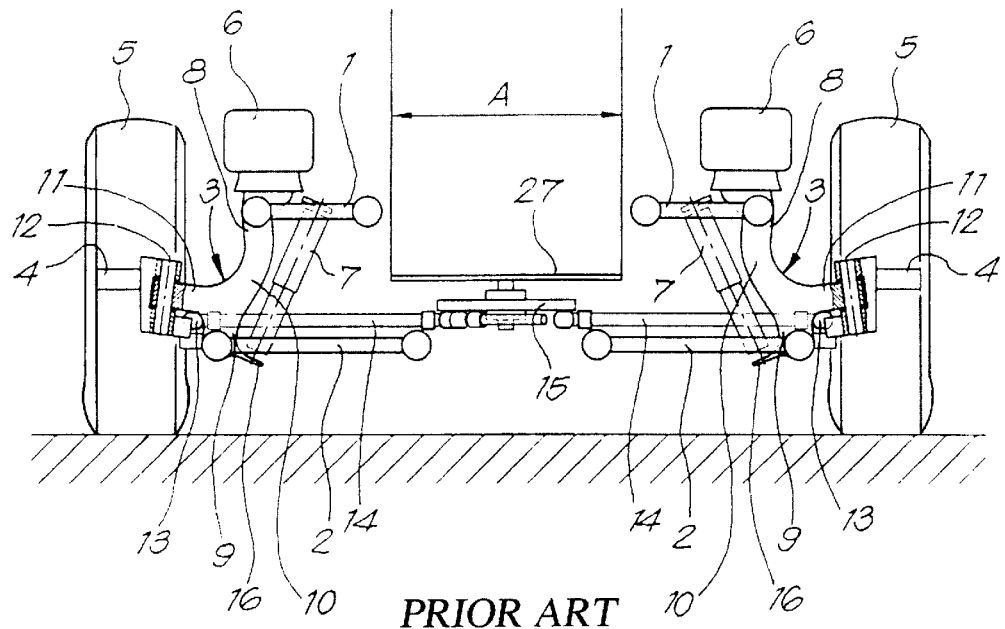
FIG. 1 schematically represents a front-wheel suspension as known from the state of the art.

A front-wheel suspension for a motor vehicle, in particular buses, substantially consists of upper and lower suspension arms 1, 2, respectively; a connection piece 3 between these upper and lower suspension arms 1 and 2, whereby said connection piece 3 also is connected to the wheel axle 4 of the front wheel 5; an air bellows 6; and a hydraulic shock absorber 7 between the connection piece 3 and the chassis of the bus or such.

In a classic suspension, as represented in FIG. 1, the air bellows 6 is mounted adjacent to the front wheel 5 of the bus or such, whereby in the represented example the connection piece 3 is realized more or less in a T-shape and whereby the two extremities 8 and 9 of the part 10 of the connection piece 3 are fixed at the upper suspension arms 1 and the lower suspension arms 2, respectively, whereas the other part 11 of the T-shaped connection piece 3 is connected to the wheel axle 4 of the front wheel 5.

Said front wheels 5 each can be pivoted around a vertical axle 12 in a known manner, by means of a track arm 13 which, by means of a track rod 14, is in connection with an appropriate steering transmission 15.

Finally, said hydraulic shock absorber 7 is provided in between the upper suspension arm 1 and a protrusion 16 on the connection piece 3.

Figure 2:
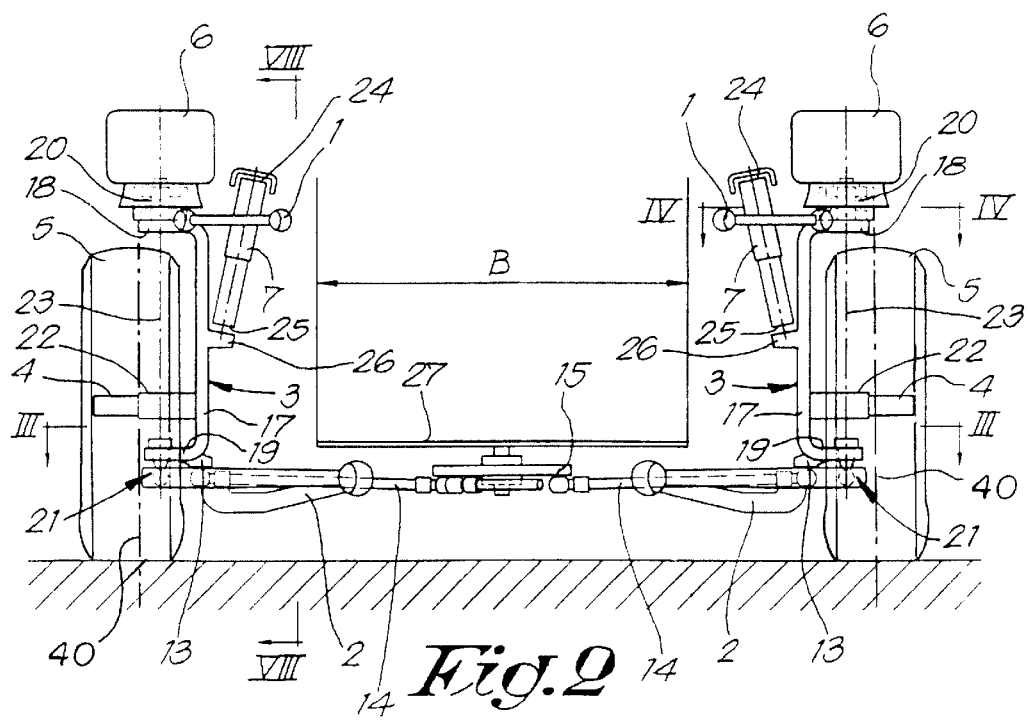
FIG. 2 schematically represents a front-wheel suspension according to the invention.

As represented in FIG. 2, an improved front-wheel suspension according to the invention also consists of, substantially horizontal, upper and lower suspension arms 1, 2, respectively; a connection piece 3 between those suspension arms 1–2; an air bellows 6; and a hydraulic shock absorber 7.

According to the invention, the air bellows 6, however, is provided above the front wheel 5 instead of adjacent thereto.

In this embodiment, the connection piece 3 consists of an almost vertically-directed connection rod 17 having upper and lower bent parts 18, 19 defined at the upper and lower extremities thereof.

The upper bent part 18 is hingeably fixed to an upper suspension arm 1 by means of a bearing device 20 also carrying the air bellows 6, whereas the lower bent part 19 of the connection rod 17, however, is fixed at the lower suspension arms 2 by means of a ball-and-socket joint 21.

At the connection rod 17, a bushing 22 is provided in which the wheel axle 4 of the front wheel 5 is beared.

A radial axis 23 of the wheel intersects the bearing device 20 and the ball-and-socket joint 21, by which the upper and lower parts 18, 19 of the connection rod 17 extend generally to a central plane 40 of the front wheel 4.

In order to be able to turn the front wheel 5, the connection rod 17, by means of a track arm 13 and a track rod 14, is connected to a steering transmission 15.

Finally, on the chassis of the bus or such, the one extremity 24 of said hydraulic shock absorber 7 is mounted, which is fixed with its other extremity 25 at a protrusion 26 of the connection rod 17.

Of course, it is also possible to attach the extremity 25 of the shock absorber 7 to a lower suspension arm 2.

The functioning of the improved suspension according to the invention is very simple and as follows.

Due to the horizontal or almost horizontal positioning of the suspension arms 1–2, the movement of the chassis of the respective bus or such, in respect to the front wheels 5, will be substantially vertical.

This movement is dampened by, on one hand, the hydraulic shock absorbers 7 and, on the other hand, the air bellows 6 which also take up the major part of the weight of the bus or such.

The turning of the front wheels 5 is realized by turning the steering transmission 15, as a consequence of which the track rods 14 are displaced, such that the track arms 13 allow the connection rod 17 and the front wheel 5 connected thereto to turn about the radial axis 23.

Due to the common movement of the connection rod 17 and the front wheel 5 around the shaft 23, said connection rod 17 can be mounted very closely against the front wheel 5, which is not possible in the classical suspension.

It is obvious that according to the invention a considerably larger free space is obtained between the hydraulic shock absorbers 7, such that the aisle 27 of the bus or such can be made wider.

Indeed, with the suspension according to the invention, the width of the aisle 27 only is limited by the space which is necessary to enable the turning movement of the front wheels 5.

In the drawings, the width of the aisle 27 in a classical suspension is indicated by A, whereas the width of the aisle 27 in the improved suspension according to the invention is indicated by B, which width is considerably larger than width A.

Figure 3:
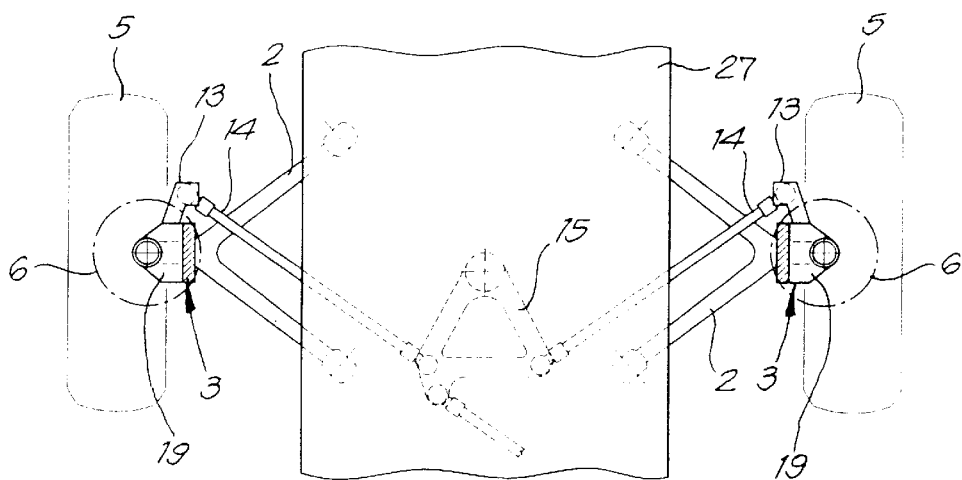
FIG. 3 represents a diagrammatic cross-section according to line III—III in FIG. 2.
Figure 8:
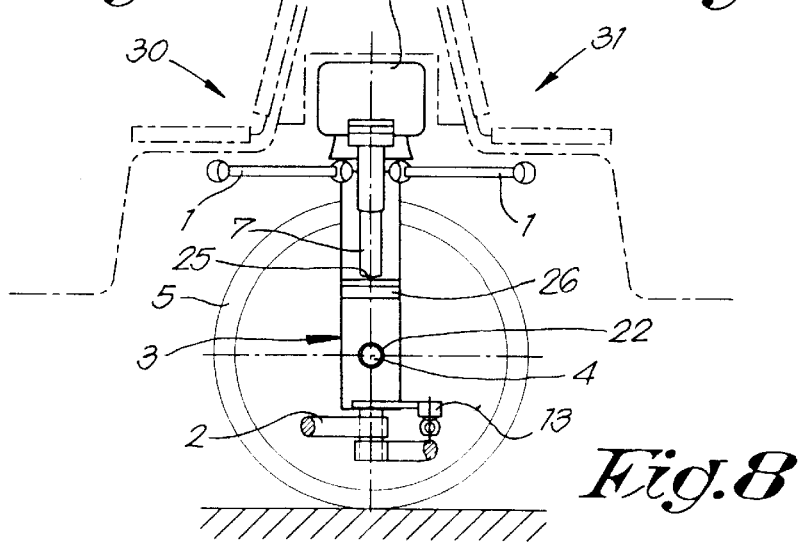
FIG. 8 represents a diagrammatic cross-section according to line VIII—VIII in FIG. 2.

As becomes clear from FIGS. 3 and 8, in the improved suspension according to the invention the air bellows 6 are positioned above the front wheels 5. These air bellows 6, however, preferably will be situated in the space between the backs 28–29 of two seats 30–31 positioned with said backs towards each other, such that in the bus, no or only little space will be lost.

In FIGS. 4 to 7, finally still a number of possible configurations for the upper suspension arms 1 is represented.

Hereby, always two of the upper suspension arms 1 are situated more or less perpendicular to each other, as a result of which forces in any direction in the horizontal plane can be absorbed.

Figure 4:
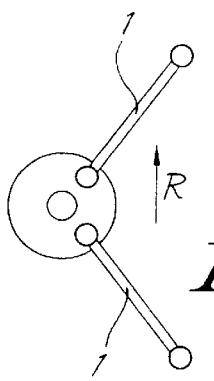
FIG. 4 represents a diagrammatic cross-section according to line IV—IV in FIG. 2.

In FIG. 4, the upper suspension arms 1 are situated according to an angle of approximately 45 in respect to the driving direction R, and the axis' of said suspension arms 1 intersect each other on the radial axis 23, such that the moment of the forces in said suspension arms 1 is zero.

Figure 5:
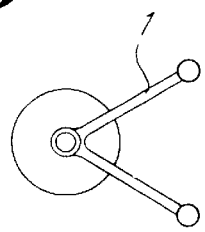
FIGS. 5 to 7 represent cross-sections similar to those of FIG. 4, however, for embodiment variants.

The suspension arms 1 represented in FIG. 5 consist of one piece, whereby the bearing of said suspension arms is of the spherical type.

Figure 6:
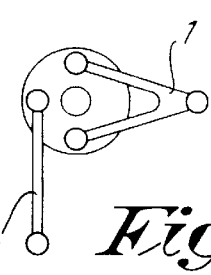
Figure 7:
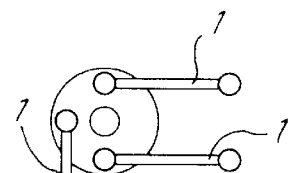

In FIGS. 6 and 7, however, the suspension arms substantially are situated according to the driving direction R, perpendicular to the driving direction R, respectively, of the bus or such.

The present invention is in no way limited to the forms of embodiment described heretofore and represented in the drawings, however, such improved front-wheel suspension for buses and such can be realized in different variants, while still remaining within the scope of the invention.

What is claimed is:

1. A front-wheel suspension for a motor vehicle, the suspension configured for each corresponding front wheel of the motor vehicle, the suspension comprising:
   at least one upper suspension arm;
   at least one lower suspension arm;
   a pivotable connection piece connected to and positioned between said upper and lower suspension arms, and linked to a wheel axle connected to a corresponding front wheel, the connection piece including a connection rod defining at an upper extremity thereof an upper part connected to the upper suspension arm, and at a lower extremity thereof a lower part connected to the lower suspension arm, the upper part of the connection rod hingedly connected to the upper suspension arm by a bearing device;
   a hydraulic shock absorber positioned above a corresponding front wheel and in communication with the connection piece and arranged to be connected to a chassis of a motor vehicle; and
   an air bellows positioned above a corresponding front wheel and connected to the upper part of the connection rod via the bearing device.

2. The suspension of claim 1, wherein the connection rod is arranged to extend in a vertical or substantially vertical direction in relation to a longitudinal direction of a motor vehicle.

3. The suspension of claim 1, wherein the upper and lower parts of the connection rod are arranged to extend in a transverse or substantially transverse direction of a motor vehicle.

4. The suspension of claim 1, wherein the connection piece is arranged to connect to a wheel axle of a corresponding wheel by a bushing.

5. The suspension of claim 1, further comprising a ball-and socket-joint connecting the lower part of the connection rod to the lower suspension arm.

6. The suspension of claim 5, wherein the upper and lower parts of the connection rod are configured to generally extend to a central plane of a corresponding front wheel such that a radial axis defined along a radius of a front wheel intersects the ball-and-socket joint and the bearing device.

7. The suspension of claim 1, wherein the connection piece includes a protrusion defined along the length thereof and configured to cooperate with one end of the hydraulic shock absorber.

8. The suspension of claim 1, further comprising two upper suspension arms positioned generally perpendicular to one another, and arranged such that a radial axis of a corresponding front wheel intersects a portion of said two upper suspension arms.

9. The suspension of claim 8, wherein at least one upper suspension arm is arranged to extend substantially parallel along a driving direction of a motor vehicle and at least one upper suspension arm is arranged to extend substantially perpendicular to a driving direction of a motor vehicle.

10. The suspension of claim 9, wherein the upper suspension arms are arranged to extend in a direction at least at an angle approximately 45° in relation to a driving direction of a motor vehicle.

11. The suspension of claim 1, wherein the air bellows are arranged to be positioned in a motor vehicle in a space between opposing seat backs of two seats located in a motor vehicle.

* * * * *